(12) United States Patent
Partansky et al.

(10) Patent No.: US 11,065,648 B2
(45) Date of Patent: Jul. 20, 2021

(54) BLOWER SYSTEM TO SEPARATE CONSTITUENTS OF AGRICULTURAL BIOMASS

(71) Applicant: Sorting Robotics Inc., Van Nuys, CA (US)

(72) Inventors: Nohtal Partansky, Northridge, CA (US); Sean Lawlor, Van Nuys, CA (US); Cassio Elias Dos Santos, Jr., Van Nuys, CA (US)

(73) Assignee: Sorting Robotics Inc., Van Nuys, CA (US)

( * ) Notice: Subject to any disclaimer, the term of this patent is extended or adjusted under 35 U.S.C. 154(b) by 0 days.

(21) Appl. No.: 16/841,545

(22) Filed: Apr. 6, 2020

(65) Prior Publication Data

US 2020/0316649 A1    Oct. 8, 2020

Related U.S. Application Data

(60) Provisional application No. 62/830,991, filed on Apr. 8, 2019.

(51) Int. Cl.
| | |
|---|---|
| *B07B 11/04* | (2006.01) |
| *B07B 11/06* | (2006.01) |
| *B07B 9/02* | (2006.01) |
| *B07B 11/02* | (2006.01) |
| *A01F 12/48* | (2006.01) |
| *B07B 4/08* | (2006.01) |

(52) U.S. Cl.
CPC ............... *B07B 9/02* (2013.01); *A01F 12/48* (2013.01); *B07B 4/08* (2013.01); *B07B 11/02* (2013.01)

(58) Field of Classification Search
CPC .. B07B 9/02; B07B 4/08; B07B 11/02; B07B 11/04; B07B 11/06; B07B 15/00; B07B 9/00; A01F 12/48
USPC ........... 209/138, 23, 28, 29, 139.1, 645, 711
See application file for complete search history.

(56) References Cited

U.S. PATENT DOCUMENTS

| | | | | |
|---|---|---|---|---|
| 4,044,695 | A * | 8/1977 | Mackenzie | B07B 9/02 110/220 |
| 4,303,502 | A * | 12/1981 | Lacher | A24B 5/10 131/312 |
| 4,915,824 | A * | 4/1990 | Surtees | A24B 5/10 209/137 |

* cited by examiner

*Primary Examiner* — Charles A Fox
*Assistant Examiner* — Molly K Devine
(74) *Attorney, Agent, or Firm* — Cognition IP, P.C.; Edward Steakley (57) ABSTRACT

A system to automate the separation of agricultural products. The system includes an enclosure, sealed with permeable mesh to permit airflow and walled with non-porous material to prevent agricultural material from escaping the enclosure while allowing for flow to pass freely. This system is capable of separating material without mechanical interaction, such as with grippers or end effectors, and relies on air flow through the enclosure to create separation between the desired and undesired material using ballistic coefficient as a fundamental differentiator between constituent material of the agricultural products. This is accomplished with a variable speed fan which blows air through the enclosure, lifting and separating material based on the ballistic coefficient of that material and the flow settings. Dividers are used to separate and capture the products for retrieval at the conclusion of operation.

20 Claims, 9 Drawing Sheets

BLOWER SYSTEM TO SEPARATE CONSTITUENTS OF AGRICULTURAL BIOMASS

CROSS-REFERENCE TO RELATED APPLICATIONS

This application claims the benefit of U.S. Provisional Application No. 62/830,991, filed Apr. 8, 2019, which is hereby incorporated by reference in its entirety.

BACKGROUND

Agricultural product harvested from production locations, either indoor or outdoor, and including, but not limited to, farms, greenhouses, hydroponic facilities, aeroponic facilities, or other, captures material necessary for the growth of the product but not generally desired as part of the final product.

As an example, tomatoes grow on vines with leaves necessary for the plant to grow to maturity. However, the leaves and, usually, stem are not included as the final product sold to consumers or customers. Here the tomato is the desired "primary product" while everything else is a less desired or undesired as "secondary products."

Considerable effort is expended to remove the primary product from the secondary product. This effort may be manual in nature, completed by humans who individually pick the primary product from the secondary product, or it may be completed by mechanical or robotic systems. These non-human systems largely operate on the principal of a size, mass, or color (together, the "general characteristics") discrepancy between the primary product and the secondary products.

This is the case for many agricultural products, such as apples, tomatoes, and grapes, among many others. The mass of an apple is much greater than the mass of its leaves; the color of an apple is generally quite distinct from the color of its leaves; the size of the apple is much larger than the size of its leaves.

However, for agricultural products where the general characteristics of the primary product and secondary products are quite similar, autonomous or robotic solutions are far more complicated because they cannot rely on easily apparent differences in the general characteristics to operate efficiently or effectively.

Further, human based solutions are challenging to rely on because these subtle differences in general characteristics of primary and secondary products are hard to identify. Continued focus for the human becomes mentally taxing over long periods of time and may lead to a degradation of the separation quality and a lack of consistency. Human vision is particularly inefficient in separating primary product from secondary product which is almost identical in color.

For example, industrial hemp ("hemp") biomass of the species *Cannabis sativa* L. is generally comprised of four constituents: stem, water leaf, sugar leaf, and flower. Hemp is grown to harvest cannabinoids from the flower, the primary product, and fiber or seeds from the stem, leaves leftover as the secondary products. The primary and secondary products together form the aforementioned biomass. In the case of hemp, there may be additional uses for these secondary products to extract fiber or seeds for use in other industrial processes but for those parts to be usable they must be separated from the primary products.

These primary products, which are again flower of the plant are differentiated by size into two grades: A-grade and B-grade, which are similar in relative comparison to letter grades in the education system.

A-grade primary products ("A-products") are larger than the B-grade primary products ("B-products"), where B-products are generally about the size the secondary products. This characteristic in particular makes the separation of B-products quite challenging. A-products are larger than all other components, and thus is relatively easy to separate in a similar manner as other agricultural products discussed earlier.

Namely, in certain existing embodiments, biomass is vibrated across increasingly larger slots or openings along a path or track constructed of a mesh or bands which fan out from a point of origin to provide a linearly increasing opening for the products to fall through. As the secondary products fall early on the track because they are smaller, the larger A-product passes over these small openings and reaches the later stages of the track, ultimately separated from both the secondary products and B-product.

The result of this embodiment is two products: A-products and trim. Here, trim comprises leftover primary product in the form of B-products, which cannot be easily separated from secondary product, and all secondary products. Trim is typically used to produce less pure forms of products, which may have more industrial applications and is generally processed before being used by any consumers. The important takeaway is the lingering B-products intermixed in the secondary products for which separation is extremely challenging which are valuable components.

Considering this, there exists an opportunity to separate B-products from the leftover trim to thoroughly separate all of the primary products from the secondary products.

This opportunity could be solved by humans who manually separate B-products from the secondary products, but as discussed previously this problem is extremely challenging for humans to solve, and is subject to human attention, dexterity, and ability, all while combating the cost of human labor.

Thus, there exists an opportunity not just to separate B-products from the secondary products hemp biomass, but to automate this process so that the separation may be done efficiently, accurately, and cost effectively.

SUMMARY

In some embodiments, a blower system is configured to separate constituents of agricultural material (such as hemp biomass) using one or more fans to blow air through the material. An enclosure keeps the material contained in a chamber while air is blown upwards through the material thereby lifting and separating lighter portions of the material from heavier portions of the material, depending on the characteristics of the air flow. Generally, in two phases, lighter material is first lifted and directed through conduits and is collected in one or more receiving containers while heavier material remains behind to be collected or exhausted into different receiving containers.

In one embodiment, the flow rate of the air is increased to lift all the constituent parts of trim to a mesh grid of the enclosure. The flow rate is then decreased to allow the heavier components of the trim to fall from the mesh grid to the floor, while the lighter components remain on the mesh grid. A divider is inserted to split the enclosure and divide the constituents on the floor from the constituents on the mesh grid so the two can no longer mix. The air flow is turned off, and all constituents fall to their respective floors.

The lower floor contains the desired B-products plus stem. The high floor contains primarily undesired secondary products.

By utilizing this blow method to remove as many of the secondary and tertiary products from the trim, later methods utilized to identify and separate only B-products will be easier because there are fewer constituents to parse through.

Further, in some embodiments, there is a blower system and method for separating plant-based material by using variable airflow. In one embodiment of the system, a fan assembly is coupled to an airflow enclosure. The fan assembly may include one or more fans configured to direct airflow through the airflow enclosure upward through an airflow turbulator. The airflow turbulator creates air turbulence to the air flowing through the airflow turbulator. A separation tray assembly is moveably coupled to the airflow enclosure and a tray seal of a separation chamber. The separation chamber has an upper and lower tray seal for sealing the tray assembly with the separation chamber. A diverter assembly is coupled to the separation chamber to divert material in the separation chamber into one or more ducts connected to the diverter assembly. The one or more ducts may be interconnected to aggregate material receptacles for collecting separated material.

Agricultural product or material is placed or received onto a separation tray of the separation tray assembly. The separation tray has a circular lip that forms a walled border around an opening. A base is disposed across the bottom walled border and forms a separation sieve. The base has multiple openings disposed throughout the base. The base extends across the entirety of the separation tray lip opening and has a bottom surface and a top surface. Airflow is directed from one or more air blowers (such as a fan) through the bottom surface of the base. A first portion of lighter material is separated from a second portion of heavier material by controlling the airflow of the one or more air blowers causing the first portion of the lighter material to move upward through a conduit while leaving the second portion of the heavier material in the separation tray. The separated first portion of the lighter material is collected after moving the first portion of the lighter material through the conduit into one or more aggregated material receptacle for collection (such as a bin, container or other receiving enclosure).

Additionally, in some embodiments, the system and methods may include: A fan assembly comprising one or more air blowers (e.g., fans) oriented to direct airflow through an airflow enclosure (such as a conduit, pipe, or tube) upward towards a turbulator. A fan control unit for adjusting the airflow characteristics of the one or more fans. A separation tray wherein the material may be placed for separation. A tray seal mounting assembly wherein the separation tray may be placed before the initiation of the separation process. A separation chamber where the material to be separated may be lifted and dispersed to aid in the separation of the material. A diverter assembly, that may be controlled by a microcontroller, processor, or other electronic circuitry. One or more ducts which may be attached to the diverter assembly and may direct the separated material into one or more centrifugal force appliers based on the controlling of a diverter flap. One or more aggregate material collectors which may collect the separated material that falls from the centrifugal force appliers.

The features and components of these embodiments will be described in further detail in the description which follows. Additional features and advantages will also be set forth in the description which follows, and in part will be implicit from the description, or may be learned by the practice of the embodiments.

BRIEF DESCRIPTION OF THE DRAWINGS

These drawings and the associated description herein are provided to illustrate specific embodiments of the invention and are not intended to be limiting.

DETAILED DESCRIPTION

In this specification, reference is made in detail to specific examples of the claimed systems and methods. Some of the examples or their aspects are illustrated in the drawings.

For clarity in explanation, the systems and methods herein have been described with reference to specific examples, however it should be understood that the systems and methods herein are not limited to the described examples. On the contrary, the systems and methods described herein cover alternatives, modifications, and equivalents as may be included within their respective scopes as defined by any patent claims. The following examples of the systems and methods are set forth without any loss of generality to, and without imposing limitations on, the claimed systems and methods. In the following description, specific details are set forth in order to provide a thorough understanding of the systems and methods. The systems and methods may be practiced without some or all of these specific details. In addition, well known features may not have been described in detail to avoid unnecessarily obscuring the systems and methods.

The following generally relates to the separation and sorting of agricultural biomass material. The separation and sorting of the material into a light material and heavy material may be accomplished by adjusting the speed of one or more air blowers (e.g., fans). The adjustment of the one or more fans independent of each other may allow for specific airflow characteristics to be generated. Airflow characteristics may include velocity, volume, turbulence, direction, pressure, force, duration and combinations thereof.

Figure 1:
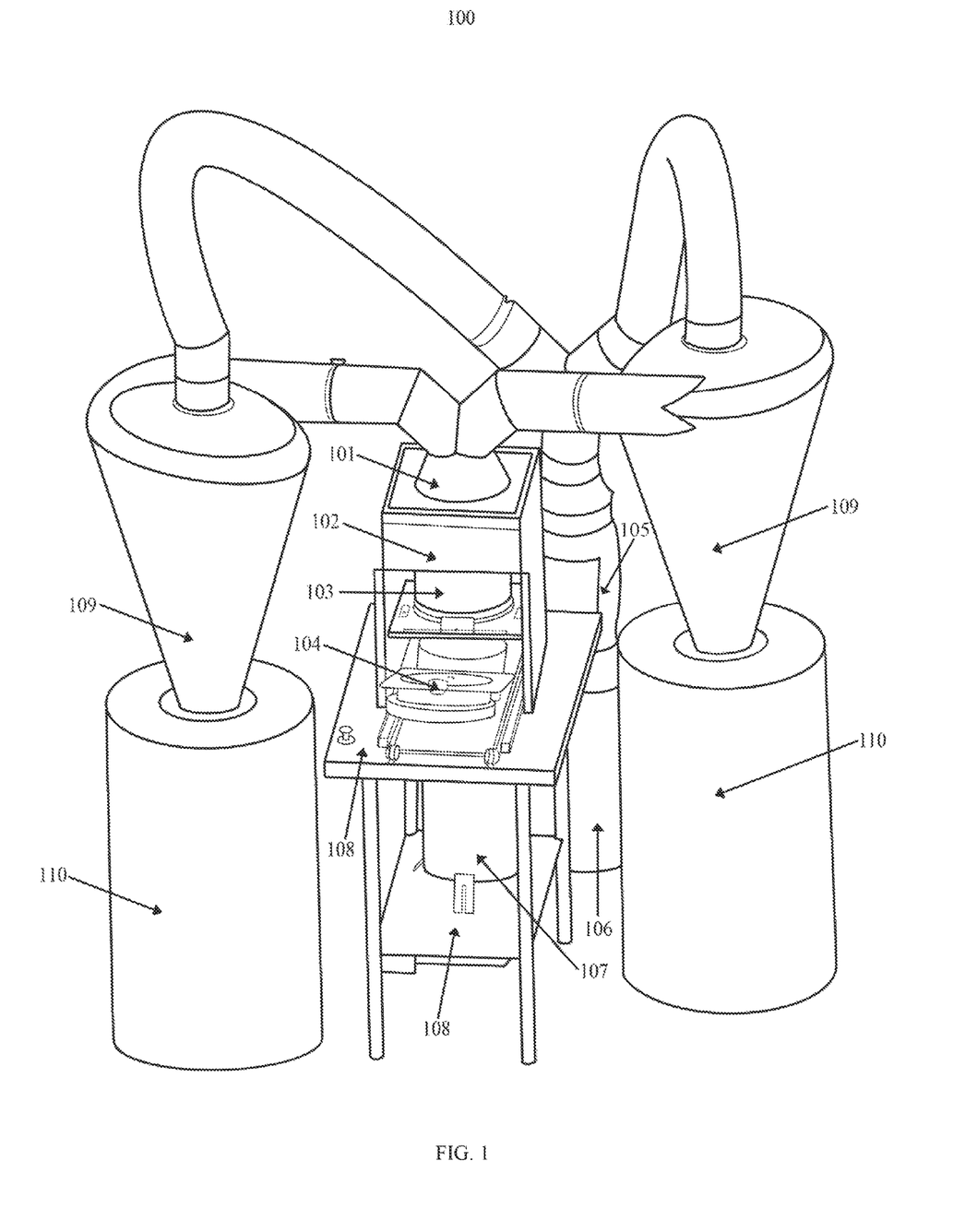
FIG. 1 shows an example of an automated biomass sorting system in accordance with aspects of the present disclosure.

FIG. 1 shows an example of an automated biomass sorting system 100 in accordance with aspects of the present disclosure. The automated biomass sorting system 100 may comprise diverter assembly 101, quick release mount 102, separation chamber 103, separation tray assembly 104, particulate fan assembly 105, particulate collection receptacle 106, airflow enclosure 107, support table 108, centrifugal force appliers 109 and aggregate material receptacles 110.

Diverter assembly 101 may attach to the quick release mount 102 and the separation chamber 103. Material lifted from the separation chamber 103 may enter the diverter assembly 101, where it may be diverted, through diverter ducts to the centrifugal force appliers 109.

Quick release mount 102 may serve as a mounting point for the diverter assembly 101, the separation chamber 103, and the support table 108.

Separation chamber 103, may be manufactured from clear acrylic or other clear materials, to allow for the operator to view the progress of the separation. A non-clear material may also be used. A sensor may be utilized within the separation chamber 103 to determine at which point the separation has completed and when to adjust the airflow entering the chamber to facilitate the collection of the heavier materials. The sensor may be a visual sensor (e.g. camera) or other sensor such as pressure sensor to determine when the light material has been separated and evacuated from the chamber. The light material leaves the separation chamber 103 and enters the diverter assembly 101.

Separation tray assembly 104 may receive from an operator or other machine, the material that is to be separated. The material may be placed on a screen or mesh bottom of the separation tray assembly 104. The material loading may be automated to increase the rate of processing. The separation tray assembly 104 may be attached to a linear motion system to allow the separation tray assembly 104 to be placed between the separation chamber 103 and the airflow enclosure 107. The movement of the separation tray assembly 104, allows for the material to be loaded and introduced to the airflow for separation. The separation tray assembly 104 may also be operated to shake to increase the rate of separation of the material. Millimeter pulses of movement along the linear motion system, back and forth, may be used to generate the shaking of the separation tray assembly 104. Alternatively, a separate shaking mechanism may be attached to the separation tray assembly 104. The separation tray assembly 104 may be mounted to a support table 108.

Particulate fan assembly 105 may comprise a particulate fan housed within the particulate fan assembly 105. The particulate fan may be operated to produce back pressure within the centrifugal force appliers 109, facilitating the removal of particulate from the material to be collected.

Particulate collection receptacle 106 may be any receptacle capable of storing particulate. The particulate collection receptacle 106 may vent the incoming air through a filter to reduce or eliminate the particulate from entering the work environment.

Airflow enclosure 107 may be a duct, tube, pipe or other enclosure with at least one opening or inlet on a first side of the enclosure and an exhaust opening on a second side of the enclosure. The exhaust opening may be such that the direction of airflow leaving the airflow enclosure is in a vertical direction. The net force of the airflow may be vertical, while still allowing for vortices and turbulence to exist. One or more fans 225 may be attached at the inlet opening of the airflow enclosure 107. The one or more fans 225, may be controlled to produce airflow through the airflow enclosure 107 and up through the material placed within the screen or mesh of the separation tray assembly 104.

Support table 108 may be used as a rigid structure which the linear motion system, quick release mount 102, and airflow enclosure 107 may be mounted.

Centrifugal force appliers 109 may be of a cyclonic type. Material and particulate may be fed into the centrifugal force appliers 109 by way of a duct from the diverter assembly 101. Material circulates within the centrifugal force appliers 109 causing particulate to lift to the upper region and to be removed by the back pressure created by the particulate fan assembly 105. The remaining material circulating in the centrifugal force appliers 109, may then fall from the centrifugal force appliers 109 into the aggregate material receptacles 110.

Aggregate material receptacles 110 may receive the separated and sorted materials produced by the separation system. The aggregate material receptacles 110 may be of a batch collection type (e.g. barrels) or of a continuous collection type (e.g. conveyor systems).

Figure 2:
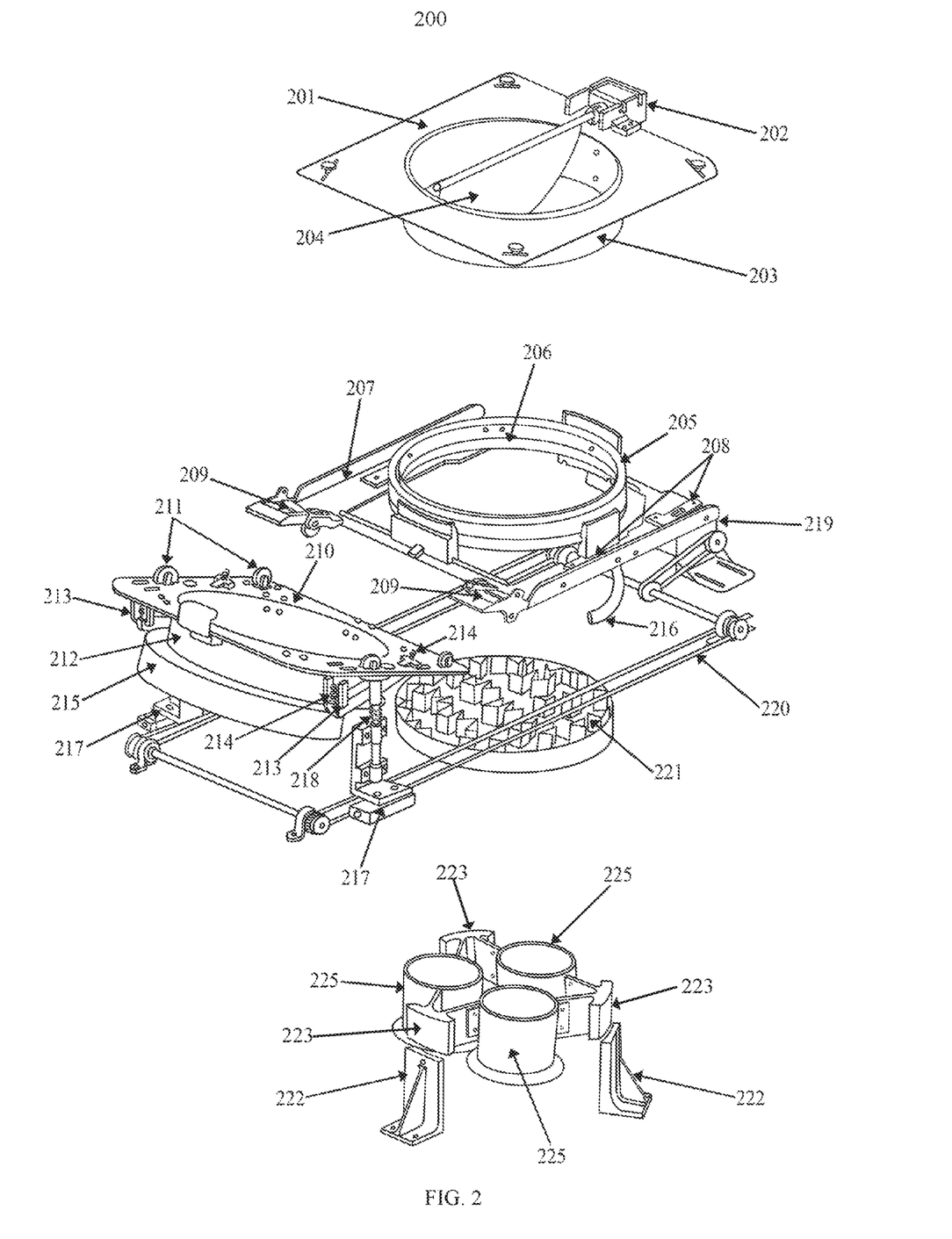
FIG. 2 shows an example of an independent air sieve unit in accordance with aspects of the present disclosure.

FIG. 2 shows an example of an independent air sieve unit 200 in accordance with aspects of the present disclosure. The independent air sieve unit 200 may comprise diverter assembly collar 201, diverter flap motor 202, diverter assembly joint 203, diverter flap 204, separation chamber lip 205, separation chamber seal 206, cam guides 207, cam ramps 208, cam guide wheel mount ramps 209, separation tray seal interface 210, tray cam wheels 211, separation tray 212, tray brackets 213, tray bracket compression springs 214, separation tray lip 215, airflow enclosure lip seal 216, tray assembly mounts 217, tray mount compression springs 218, linear motion drive motor 219, linear motion tracks 220, turbulator 221, airflow enclosure mounts 222, trinity mount 223 and fans 225.

Diverter assembly 101 may comprise diverter assembly collar 201, diverter flap motor 202, diverter assembly joint 203 and diverter flap 204. The diverter assembly collar 201 may be used as an interface to which ducts may be attached or mounted. Diverter flap motor 202 may be controlled by an air sieve control unit (not shown), causing the diverter flap 204 to be reposition from one side to another. The positioning of the diverter flap 204 determined the direction that material will be directed during the operation of the system. The diverter assembly joint 203 may be the point of attachment between the diverter assembly 101 and the separation chamber 103.

Separation chamber 103 may further comprise a separation chamber lip 205, and separation chamber seal 206. The separation chamber lip 205 may attach to the bottom side of the separation chamber 103 to connect the separation chamber seal 206 to the chamber. The separation chamber seal 206 may come into contact with the separation tray seal interface 210, creating an airtight seal between the separation chamber 103 and the separation tray assembly 104.

Separation tray assembly 104 may further comprise cam guides 207, cam ramps 208, cam guide wheel mount ramps 209, separation tray seal interface 210, tray cam wheels 211, separation tray 212, tray brackets 213, tray bracket compression springs 214, separation tray lip 215, airflow enclosure lip seal 216, tray assembly mounts 217 and tray mount compression springs 218. Cam guides 207 may be mounted on either side of the separation chamber 103 or separation chamber lip. Cam ramps 208 are disposed within or attached to the cam guides 207. The cam ramps 208 allow for the tray cam wheels 211 to lock into place when moved along the cam guides 207, into the proper alignment for operation of the system. The cam guide wheel mount ramps 209 may be used to engage the tray cam wheels 211, and applying a downward force in order to compress the tray bracket compression springs 214 and the tray mount compression springs 218, and transition the tray cam wheels 211 onto the cam guides. The tray assembly mounts 217 house the tray mount compression springs 218 and connect the tray brackets 213 and their tray bracket compression springs 214 to the linear motion system. provide an upward force to aid in keeping the tray cam wheels 211 locked into place in the cam ramps 208, as well as providing the force required to produce a seal between the separation chamber seal 206 and the separation tray seal interface 210. The tray bracket compression springs 214 may provide an addition force to the separation tray seal interface 210 to help maintain the proper alignment and angle needed to maintain the seal.

The separation tray 212 may include a mesh or screen bottom for holding the material to be separated and sorted. The separation tray 212 may be attached to the separation tray seal interface 210, tray brackets 213, and separation tray lip 215. The separation tray lip 215 and, airflow enclosure lip seal 216 may be oriented such that when the separation tray assembly 104 is positioned in an operation position the, separation tray lip 215 and the airflow enclosure lip seal 216 form a seal between the separation tray 212 and the airflow enclosure 107.

The linear motion system may comprise a linear motion drive motor 219 and linear motion tracks 220. The linear motion drive motor 219 may be controlled to move the separation tray assembly 104 from a first position for loading the material, along the linear motion tracks 220, to a second position between the separation chamber 103 and the airflow enclosure 107. The linear motion drive motor 219 may be controlled to perform millimeter movements, alternating between a forward direction and a backward direction, to shake the material placed upon the mesh bottom of the separation tray 212.

The turbulator 221 may be of any design that increases the amount of turbulence experienced in a column of air being moved through the airflow enclosure 107. The fans 225 may be controlled together or individually to create different airflow characteristics. The fans 225 may be cycled, increasing the speed of one fan over the speed of the others. The fans 225 may also be controlled to provide bursts of air, causing a chopping effect to aid in breaking up and separating the material. The fans 225 may be mounted to the airflow enclosure 107 by way of fan mounts aligned along the vertical axis of the airflow enclosure 107. The fans 225 may also be oriented in a trinity mount 223, where each fan is not uniformly aligned along the vertical axis of the airflow enclosure 107. The fans in a trinity mount 223 or any other mounting configuration, may be mounted at differing angles to produce a more turbulent airflow. The system may be able to control the orientation of the fan mounts 223, based on preconfigured airflow profiles, to generate differing airflow characteristics.

Figure 3:
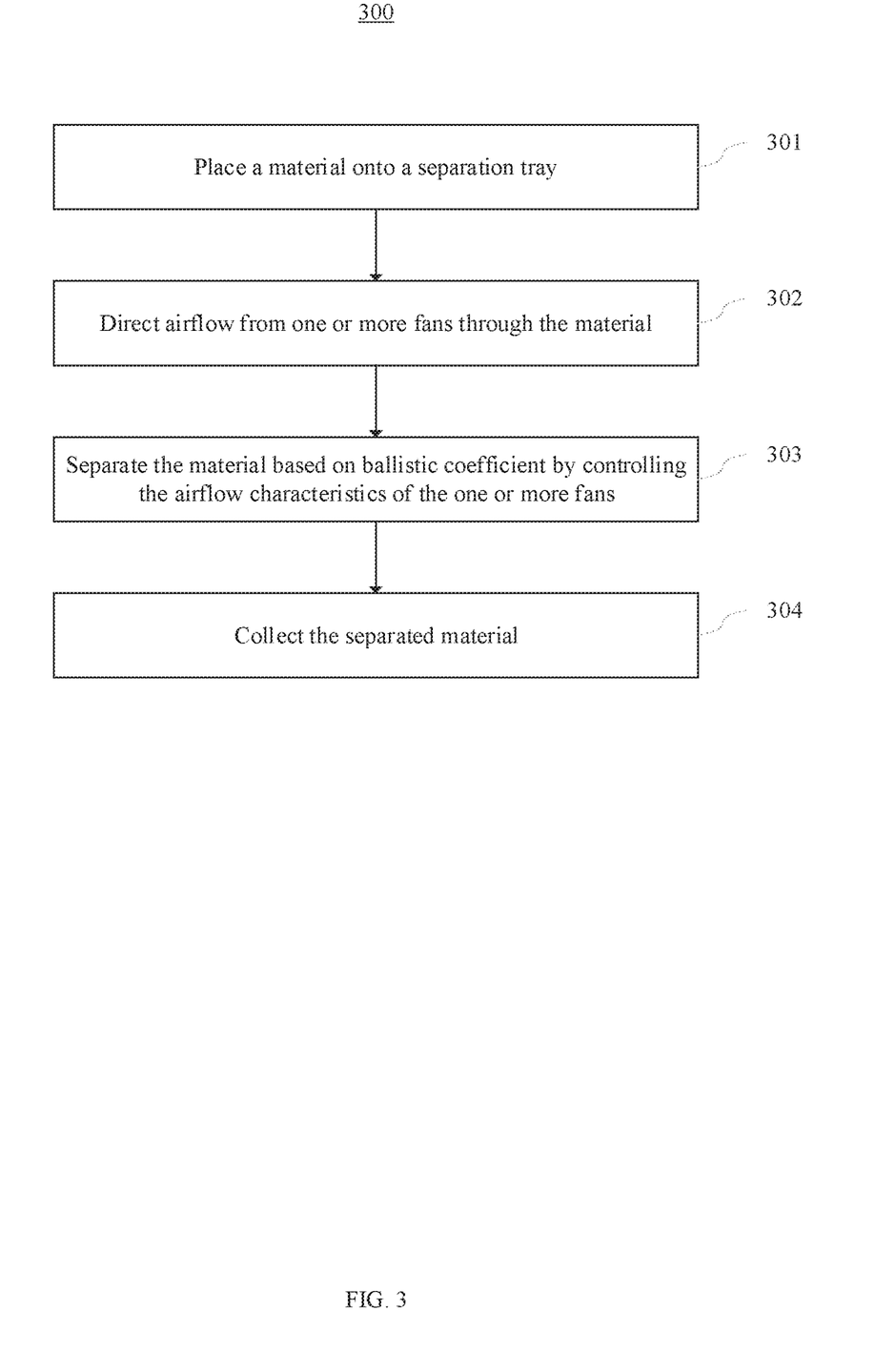
FIG. 3 shows an example of an overview of a process for separating biomass in accordance with aspects of the present disclosure.

FIG. 3 shows an example of an overview of a process 300, for separating biomass in accordance with aspects of the present disclosure.

At step 301, material is places into separation tray 212.

At step 302, the system controls one or more fans 225, directing airflow through the material placed on the mesh bottom of the separation tray 212.

At step 303, the material is separated based on ballistic coefficient. Separation is accomplished by controlling the airflow characteristics of the one or more fans. Light material, with a low ballistic coefficient requires less airflow velocity to lift the material and separate it from the heavy material.

At step 304, the separated material is then collected in aggregate material receptacles 110.

Figure 4:
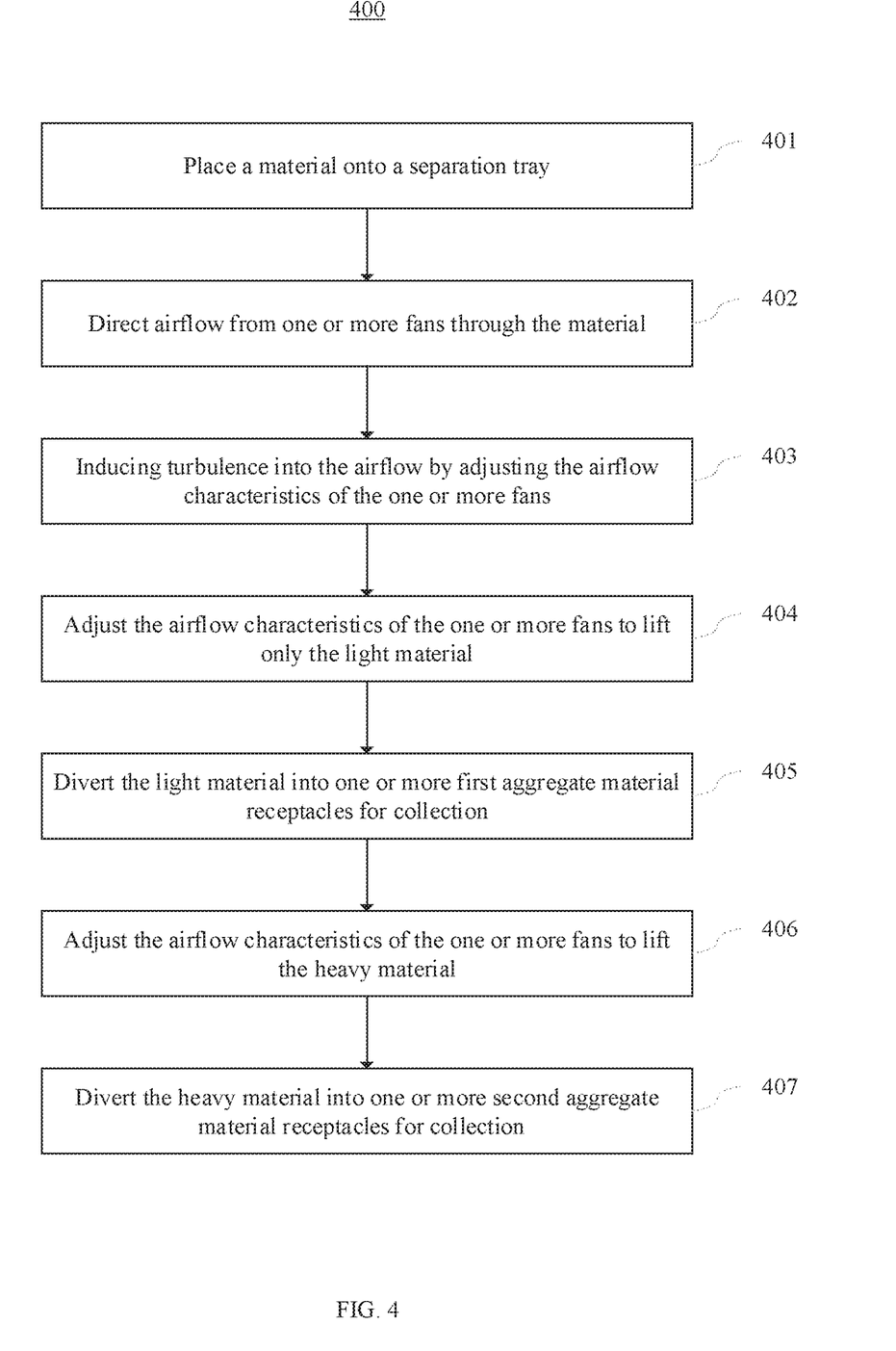
FIG. 4 shows an example of an overview of a process for separating and sorting biomass in accordance with aspects of the present disclosure.

FIG. 4 shows an example of an overview of a process 400 for separating and sorting biomass in accordance with aspects of the present disclosure.

At step 401, material is placed into separation tray 212.

At step 402, the system controls one or more fans 225, directing airflow through the material placed on the mesh bottom of the separation tray 212.

At step 403, the system induces turbulence into the airflow by adjusting the airflow characteristics of the one or more fans 225. Turbulence may also be induced by passing the airflow through one of more turbulators 221. Turbulence may also be induced by controlling the one or more fans 225, such that the fan speeds fluctuate. When more than one fan is used, the one or more of the fans may be operated at different speeds to induce turbulence to aid in the dispersing and separating of the material.

At step 404, the airflow characteristics of the one or more fans 225 may be adjusted to produce a force great enough to lift only the light material, while leaving the heavy material on the mesh bottom of the separation tray 212.

At step 405, the system diverts the light material, up through the separation chamber 103 and diverter assembly 101, into one or more first aggregate material receptacles 110 for collection.

At step 406, the system may adjust the airflow characteristics of the one or more fans 225 to lift the heavy material off of the mesh bottom of separation tray 212 and into the diverter assembly 101, At step 407, the system diverts the heavy material in the diverter assembly 101 into one or more second aggregate material receptacles 110 for collection.

Figure 5:
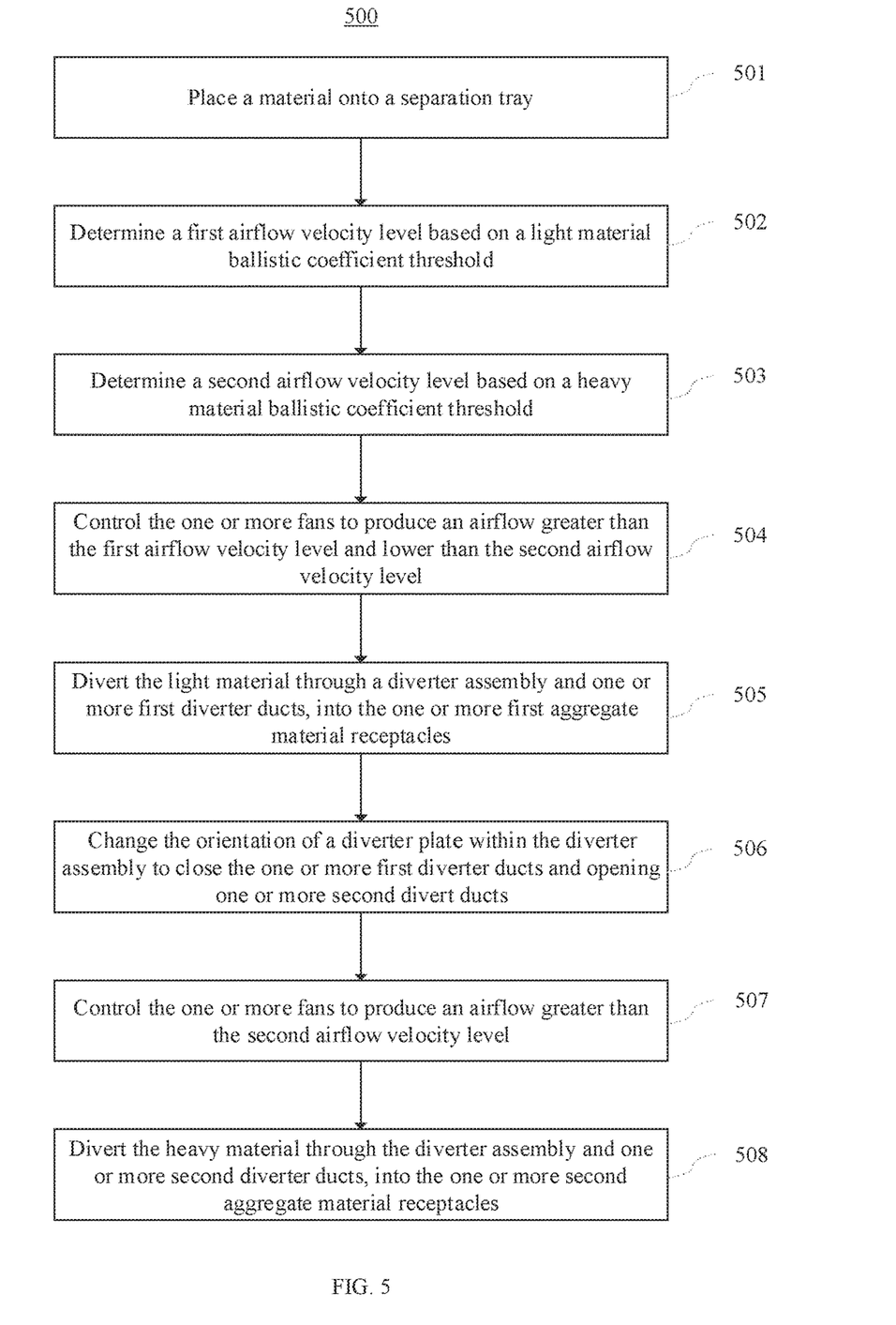
FIG. 5 shows an example of an overview of a process for separating and sorting biomass in accordance with aspects of the present disclosure.

FIG. 5 shows an example of an overview of a process 500 for separating and sorting biomass in accordance with aspects of the present disclosure.

At step 501, material is placed into a mesh bottom of separation tray 212.

At step 502, the system determines a first airflow velocity level based on a light material ballistic coefficient threshold. The determination may take into consideration the moisture content or other factors that may change the ballistic coefficient of the dried plant material being separated and sorted. Moisture content of the material may increase the weight of the material while not changing the drag area. To compensate for the change in the ballistic coefficient, a higher airflow velocity may be calculated for the first airflow velocity level.

At step 503, the system may then determine a second airflow velocity level based on a heavy material ballistic coefficient threshold. The heavy material ballistic coefficient may be determined by the same method as the light material ballistic coefficient, as well as the second airflow velocity level.

At step 504, the system may then control the one or more fans to produce an airflow greater than the first airflow velocity level and lower than the second airflow velocity level. The light material may separate from the heavy material in the separation chamber 103. The heavy material falling back to the mesh bottom of the separation tray 212, while the light material makes its way to the diverter assembly 101.

At step 505, the system diverts the light material through the diverter assembly and one or more first diverter ducts, into the one or more first aggregate material receptacles 110.

At step 506, the system may change the orientation of a diverter flap 204 within the diverter assembly 101 to close the one or more first diverter ducts and opening one or more second divert ducts.

At step 507, the system may then control the one or more fans to produce an airflow greater than the second airflow velocity level. The airflow being sufficient to lift the heavy material into the diverter assembly 101.

At step 508, the system diverts the heavy material through the diverter assembly 101 and one or more second diverter ducts, into the one or more second aggregate material receptacles 110.

Figure 6A:
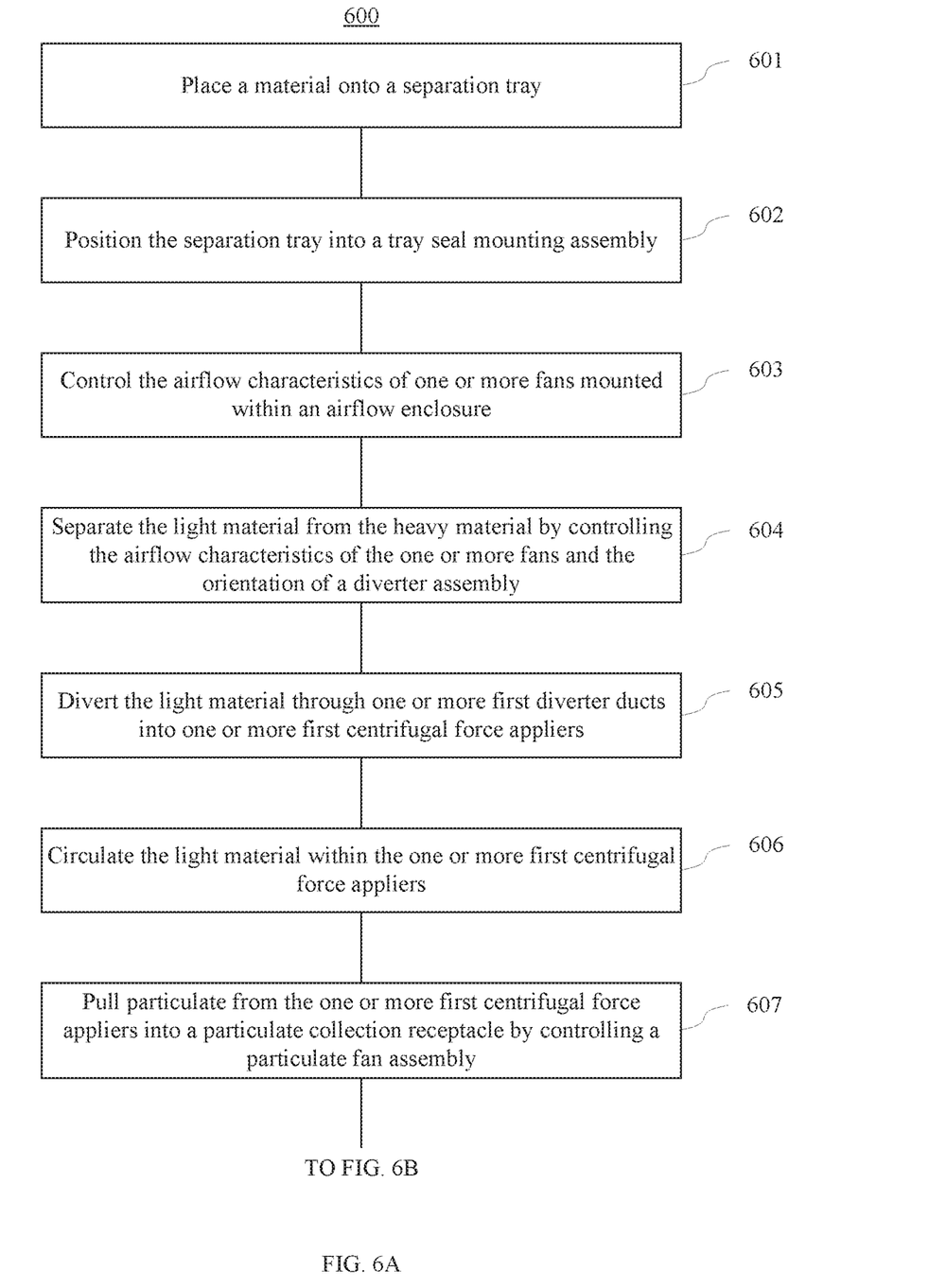
FIGS. 6A and 6B show an example of an overview of a process for separating and sorting biomass with particulate capture in accordance with aspects of the present disclosure.
Figure 6B:
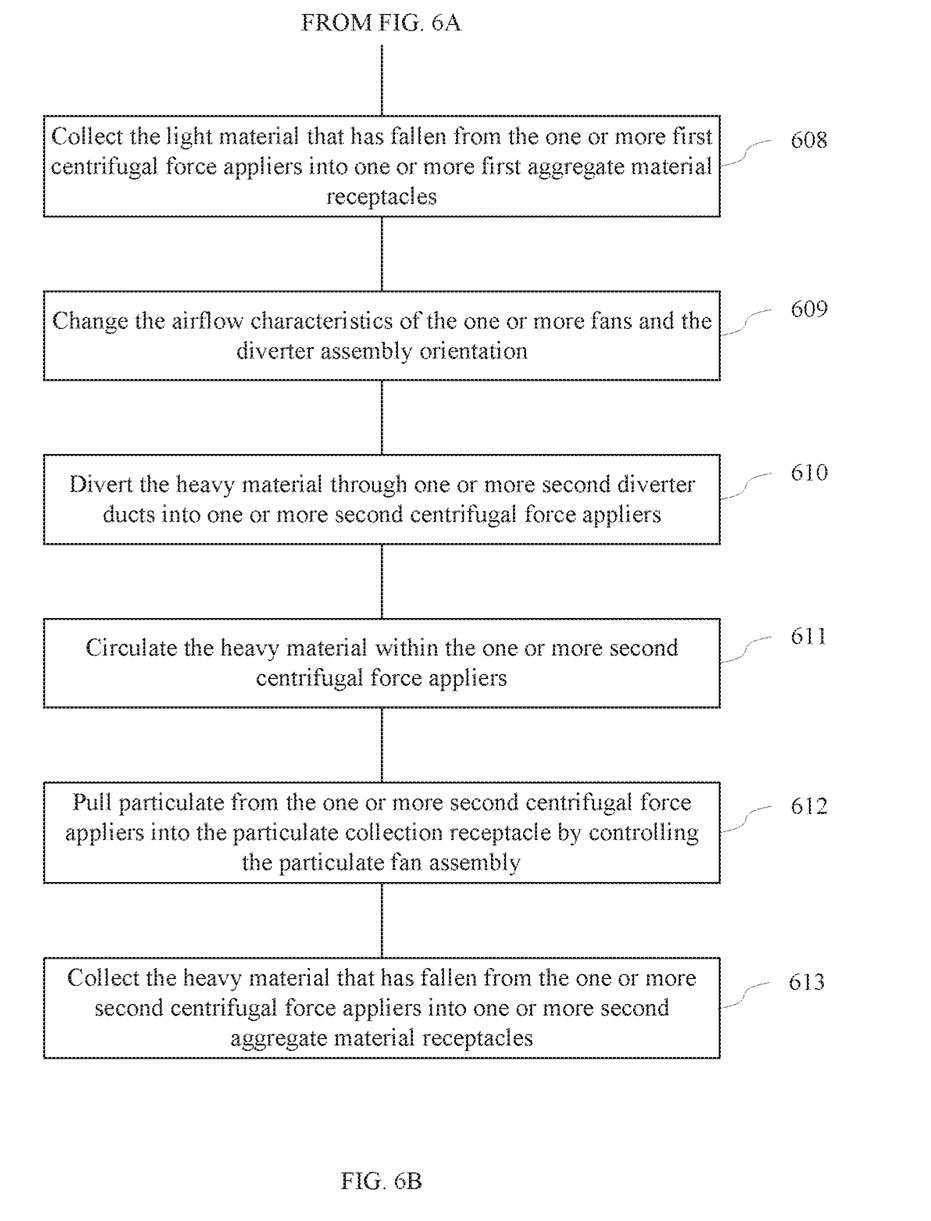

FIGS. 6A and 6B show an example of an overview of a process 600 for separating and sorting biomass with particulate capture in accordance with aspects of the present disclosure.

At step 601, material is placed into a mesh bottom of separation tray 212.

At step 602, the system may position the separation tray 212 into a tray seal mounting assembly. The seal mount assembly may be such that a seal may be created and maintained between the separation chamber 103 and the airflow enclosure 107. Alternatively, the seal may be created by components attached to the separation chamber 103, the separation tray assembly 104, and the airflow enclosure 107. Such an embodiment is shown with respect to FIG. 2 where the separation tray assembly 104 forms a seal between the separation chamber seal 206 and the separation tray seal interface 210 on the upper side, and the separation tray lip 215 and the airflow enclosure lip seal 216 on the lower side.

At step 603, the system may control the airflow characteristics of one or more fans 225 mounted within an airflow enclosure.

At step 604, the system may separate the light material from the heavy material by controlling the airflow characteristics of the one or more fans and the orientation of a diverter assembly 101.

At step 605, the system may divert the light material through one or more first diverter ducts into one or more first centrifugal force appliers 109.

At step 606, the system may circulate the light material within the one or more first centrifugal force appliers 109. The circulation of the light material within the one or more first centrifugal force appliers 109 may cause particulate to further separate from the light material.

At step 607, the particulate, separated from the light material, may be pulled out of the upper portion of the one or more first centrifugal force appliers 109 by the application of a pressure drop caused by a particulate fan assembly 105. The particulate fan assembly 105, pulls the particulate through the assembly and deposits the particulate in a particulate collection receptacle 106.

At step 608, the light material, minus particulate, is collected in a first aggregate material receptacles 110 as the circulating light material falls from the first centrifugal force appliers 109.

At step 609, the system may then change the airflow characteristics of the one or more fans and the diverter assembly orientation to prepare for the diverting of the heavy material to a second aggregate material receptacles 110.

At step 610, the system may divert the heavy material through one or more second diverter ducts into one or more second centrifugal force appliers 109.

At step 611, the system may circulate the heavy material within the one or more second centrifugal force appliers 109. The circulation of the heavy material within the one or more second centrifugal force appliers 109 may cause particulate to further separate from the heavy material.

At step 612, the particulate, separated from the heavy material, may be pulled out of the upper portion of the one or more second centrifugal force appliers 109 by the application of a pressure drop caused by a particulate fan assembly 105. The particulate fan assembly 105, pulls the particulate through the assembly and deposits the particulate in a particulate collection receptacle 106.

At step 613, the heavy material, minus particulate, is collected in the second aggregate material receptacles 110 as the circulating heavy material falls from the second centrifugal force appliers 109.

Figure 7A:
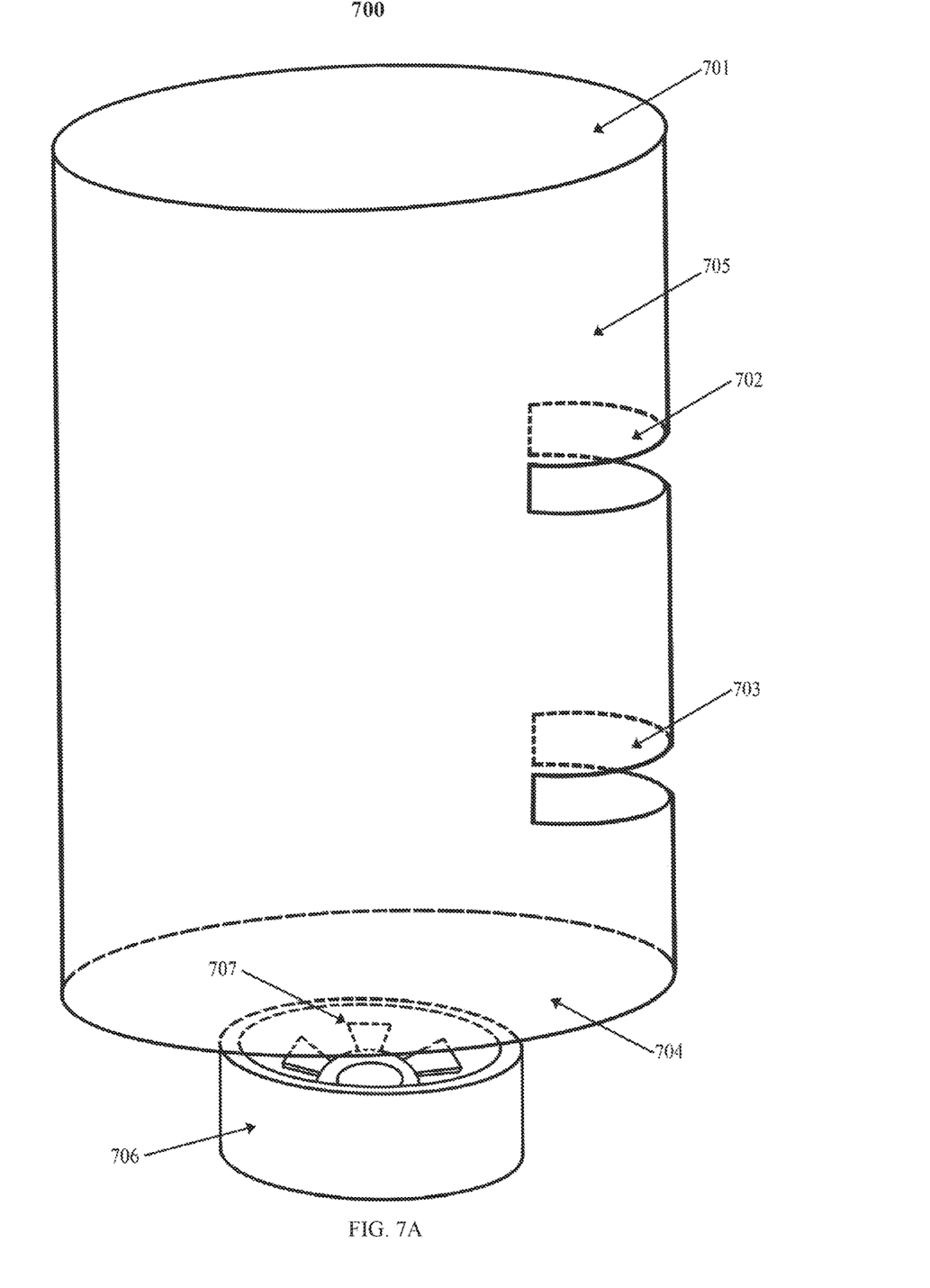
FIG. 7A shows an example biomass sorting system with the ceiling, divider, and floor inserts, or covers, removed in accordance with aspects of the present disclosure.

FIG. 7A is the blower system 700 described herein with the ceiling, divider, and floor inserts, or covers, removed to show the core structure. 701 is the ceiling which exhausts any air blown into the enclosure but also prevents any material from escaping the enclosure. 702 is the central divider section which separates the enclosure into two, as discussed in paragraph 101. 703 is the floor section, which captures the primary products after they have been separated. 704 is the lower opening of the enclosure and does not generally have a cover in most embodiments, as 703, the floor section, prevents material escape. In the provided embodiment, 705 is the cylindrical enclosure made from clear plastic. Additionally, in this embodiment, 706 is the fan with a duct, 707, seated below the enclosure used to generate flow through the enclosure, 705.

Figure 7B:
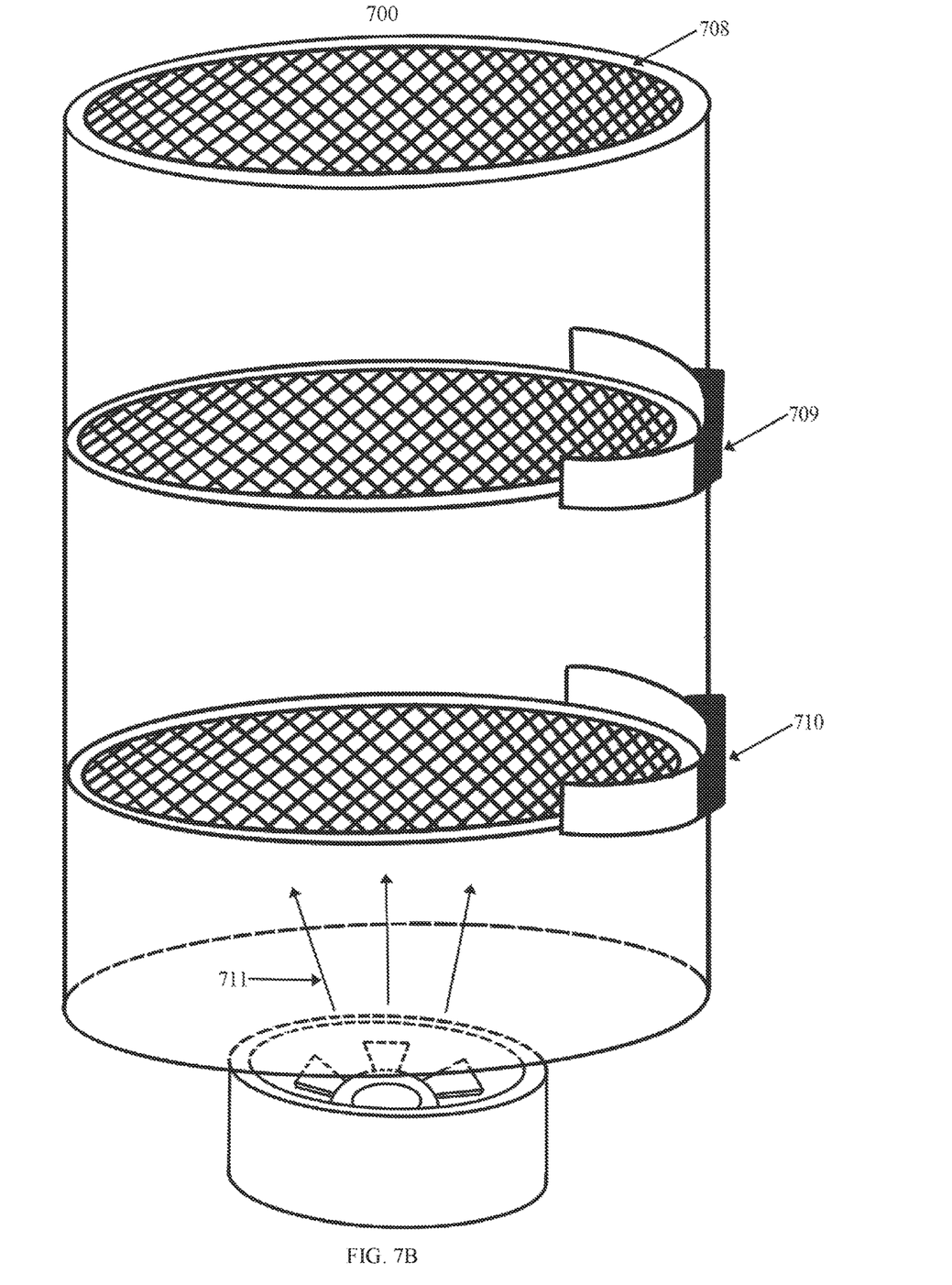
FIG. 7B shows an example biomass sorting system with all dividers and covers installed in the enclosure removed in accordance with aspects of the present disclosure.

FIG. 7B shows the described embodiment with all dividers and covers installed in the enclosure. 708 is the top cover, and shows the mesh used to prevent material from escaping through the ceiling of the enclosure. 709 is the discussed divider, which is inserted during operating after the material has been separated. 710 is the floor divider, which is inserted prior to material being deposited or entering into the enclosure and is removed in the discussed embodiment at the end of operation. Finally, 711 shows the direction of airflow generated by the fan, which creates a lifting force on the material.

In certain embodiments, air is pushed through an enclosure containing agricultural material. The material may be trim, or it may be any other agricultural product. The gas may be ambient air, or it may be any other gas, such as nitrogen or argon, among others. The gas may be at standard temperature and pressure, but other embodiments of this system may utilize other gaseous mixtures at various temperatures and pressures.

The enclosure is a plastic, thin-walled cylinder oriented vertically with the top and bottom open. The enclosure shape, diameter, height, and wall thickness may vary to accommodate various material throughput or flow behavior, and it may also be made from metal or carbon fiber, among other materials. The enclosure may also be more complex in configuration, with multiple input and output sections staggered throughout the flow path, which generally flows from bottom to top, vertically. However, alternative angles may also be utilized to modify behavior as desired.

Generally, the side walls of the enclosure are a solid, non-porous surface, with the exception of the aforementioned side slots, while the top and bottom are covered with a mesh made from plastic, metal, or fibrous material, among other alternatives. The purpose of the mesh is to prevent material from escaping the system while allowing air to flow freely. The enclosure has slots or openings in the side for dividers to be inserted. These dividers, like the containing mesh, may be made from metal, plastic, or fibrous material, among others, and are used to separate or catch the separated constituents.

The air or gas which flows through the enclosure is pushed by a ducted fan, with the fan rotational speed controlled by a microcontroller. In other embodiments, non-ducted fans may be utilized, or various configurations of flow generation devices may be utilized, including multiple fans, fans of larger diameter then the enclosure, and others.

In the embodiment discussed, the top cover and divider are not installed during loading, however the floor is installed. Material is loaded into the enclosure, either in discrete batches or continuously passed through in a constant or variable rate. Just prior to interacting with the airflow, the material is resting on the floor or base of the enclosure in the case of single batch load, or edge of the enclosure in the case of continuous feed. The initial flow speed is a "high" setting, with flow rate sufficient to lift all of the material off the floor and push it into the mesh grid of the enclosure.

As noted previously, the enclosure mesh grid may be a single mesh, or it may be comprised of multiple meshes of various density and spacing, and may have one or more additional paths exiting the enclosure. Similarly, the floor of the enclosure may be a single mesh, or it may be comprised of multiple meshes of various density and spacing, and in certain embodiments multiple paths may be utilized to control the flow and position of material as it is processed.

Once all of the material is lifted to the mesh grid, the fan is set to a "low" setting, such that heavier constituents of the material fall from the mesh grid to the floor. The material which remains on the mesh grid of the enclosure is comprised primarily of secondary products. The material which falls to the floor is comprised of the primary product B-products plus the secondary product stem. In other embodiments, control of the flow speed and behavior may create different separation behaviors which isolate the B-products entirely, or allow other secondary products than the stem into the B-products portion of the enclosure, namely the floor or lower portion of the enclosure.

The purpose of controlling the fan or fan speeds is to adjust the lift force on the material, such that fine adjustments may be made to capture desired material. Similarly, various shapes of the enclosure and internal features of the enclosure, including the material, ledges, paths, ducts, or other characteristics, modify the lift force on the material to separate material of different mass in addition to carrying the separated material in different directions along ducts or other paths.

In one mode of implementation, a divider is inserted into a slot on the side of the enclosure. In certain embodiments, the divider is made from a similar mesh to the top and bottom cover of the enclosure and is shaped similarly to the enclosure. The divider may be any means of separating or dividing the existing enclosure into two contained sections. The divider may also be a solid divider made from plastic, metal, or fibrous product.

In other embodiments the divider may be a trap door or any other path restricting device or feature which prevents the materials from mixing after they have been separated by the fan decrease to low setting. The divider will allow for easy removal of the separated materials.

After the divider is inserted, the fan is turned off to allow all material to fall to the respective floor. Generally, the floor and divider are both removable, so that their respective materials may be extricated efficiently. However, in other embodiments, the trim may be guided through various ducts or additional enclosures to continuously facilitate separation. The path traversed by the trim will be guided by multiple trap doors and fans, controlled by a microcontroller and switches.

In the simplest embodiment, the inserted divider and floor are removed at the end of processing a single batch. The divider contains the secondary products. The floor of the enclosure contains the rest of the material, generally the B-products and stem separated from the other secondary products. In other embodiments, the secondary products have been ducted away from the B-products and stem such that continuous operation and separation is achieved.

The terminology used herein is for the purpose of describing particular aspects only and is not intended to be limiting of the disclosure. As used herein, the singular forms "a", "an", and "the" are intended to comprise the plural forms as well, unless the context clearly indicates otherwise. It will be further understood that the terms "comprises", "comprising", or a combination thereof, when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to specific examples thereof, it should be understood that changes in the form and details of the disclosed examples may be made without departing from the scope of the invention. Although various advantages, aspects, and objects of the present disclosure have been discussed herein with reference to various examples, it will be understood that the scope of the disclosure should not be limited by reference to such advantages, aspects, and objects. Rather, the scope of the disclosure should be determined with reference to the claims.

What is claimed is:

1. A method for separating material by using variable airflow, the method comprising:
   positioning a separation tray into a first material receiving position;
   receiving a material onto the separation tray, the separation tray comprising:
      a separation tray lip, the tray lip forming a walled border around an opening; and
      a separation sieve, comprising a base with multiple openings disposed throughout base, the base extending across the entirety of the separation tray lip opening, the base having a bottom surface and a top surface, wherein the separation tray is linearly moveable from the first material receiving position to a second material separation position;
   positioning the separation tray into the second material separation position, wherein while in the second material separation position, the separation tray is capable of receiving airflow from the bottom surface of the base from one or more air blowers;
   directing airflow from the one or more air blowers through one or more turbulators and then through the bottom surface of the base;
   separating a first portion of the material from a second portion of the material by controlling the airflow of the one or more air blowers causing the first portion of the material to move through conduit while leaving the second portion of the material in the separation tray; and collecting the separated first portion of the material after moving the first portion of the material through the conduit into one or more first aggregate material receptacles for collection.

2. The method of claim 1, wherein the airflow is directed through an airflow enclosure coupled to the separation tray;
the one or more air blowers oriented at a bottom end of the airflow enclosure and the separation tray positioned at an opposite end of the airflow enclosure
the separation sieve of the separation tray having openings of a size which would allow air to pass through the separation sieve while not allowing the material to pass through the openings.

3. The method of claim 2, wherein air turbulence is induced into the airflow by adjusting the airflow characteristics of the one or more air blowers;
separating the first portion of material from the second portion of material, the second portion of material being heavier than the first portion of material;
adjusting the airflow characteristics of the one or more air blowers to lift only the first portion material through the conduit;
diverting the first portion of material into the one or more first aggregate material receptacles for collection;
adjusting the airflow characteristics of the one or more air blowers to lift the second portion of material; and
diverting the second portion of material into one or more second aggregate material receptacles for collection.

4. The method of claim 3, wherein separating the first portion of the material from the second portion of the material comprises:
determining a first airflow velocity level, based on a light material ballistic coefficient threshold, which would produce the airflow velocity required to lift the first portion of material off of the separationtray;
determining a second airflow velocity level, based on a heavy material ballistic coefficient threshold, which would produce the airflow velocity required to lift the second portion of material off of the separation tray;
controlling the one or more air blowers to produce an airflow greater than the first airflow velocity level and lower than the second airflow velocity level;
lifting the material into a separation chamber, and dispersing the material through the induced air turbulence;
diverting the first portion of material through a diverter assembly, the diverter assembly being connected to the one or more first aggregate material receptacles by one or more first diverter ducts;
changing the orientation of a diverter plate within the diverter assembly to close the one or more first diverter ducts and opening one or more second divert ducts;
controlling the one or more air blowers to produce an airflow greater than the second airflow velocity level; and
diverting the second portion of material through the diverter assembly, the diverter assembly being connected to the one or more second aggregate material receptacles by the one or more second diverter ducts.

5. The method of claim 4, wherein air turbulence is also induced into the airflow by forcing the airflow through one or more turbulators, positioned above one or more fans, within the airflow enclosure; and
the one or more air blowers being ducted fans.

6. The method of claim 5, wherein the separation tray is shaken during the operation of the one or more air blowers to increase the rate of separation of the first portion of material from the second portion of material.

7. The method of claim 4, wherein diverting the first portion of material into the one or more first aggregate material receptacles and the second portion of material into the one or more second aggregate material receptacles comprises:
diverting the first portion of material, through the one or more first diverter ducts, into one or more first centrifugal force appliers;
circulating the first portion of material in one or more first centrifugal force appliers, further separating the first portion of material from residual particulate;
pulling particulate from the one or more first centrifugal force appliers into a particulate collection receptacle by controlling a particulate fan assembly;
collecting the first portion of material that has fallen from the one or more first centrifugal force appliers into the one or more first aggregate material receptacles;
diverting the second portion of material, through one or more second diverter ducts, the one or more second diverter ducts connecting the diverter assembly with the one or more second centrifugal force appliers;
circulating the second portion of material in the one or more second centrifugal force appliers, further separating the second portion of material from residual particulate;
pulling particulate from the one or more second centrifugal force appliers into the particulate collection receptacle by controlling the particulate fan assembly;
collecting the second portion of material that has fallen from the one or more second centrifugal force appliers into the one or more second aggregate material receptacles.

8. The method of claim 7, wherein the positioning of the separation tray into the first material receiving position and the second material separation position is controlled by moving the separation tray along a linear motion system;
wherein positioning the separation tray into the second material separation position comprises:
positioning the separation tray into a tray seal mounting assembly, the tray seal mounting assembly comprising an upper seal and a lower seal, wherein the upper seal attaches the separation tray to the separation chamber and the lower seal attaches the separation tray to the airflow enclosure; and
the separation chamber comprising a separating space above the separation tray, wherein the material lifted by the airflow separates the second portion of material from the first portion of material.

9. The method of claim 3, wherein the material to be separated is plant material;
the plant material comprising leaves, flowers and stems, of differing sizes, shapes, and moisture content;
the first portion of material comprising the leaves; and
the second portion of material comprising the flowers and stems.

10. The method of claim 9, wherein the separating of the first portion of material and the second portion of material includes;
adjusting the airflow characteristics of the one or more air blowers based on the moisture content of the material, and the mass and drag area of the first portion of material and the second portion of material.

11. A method for separating material by using variable airflow, the method comprising:
placing a material onto a separation tray, the separation tray comprising:
a separation tray seal interface;

a separation tray;
a separation sieve, comprising a mesh or screen material, which extends the across the entirety of the opening of the separation tray;
the separation sieve having openings of a size which would allow air to pass through the separation sieve while not allowing the material to pass through;
the material comprising light material of a low ballistic coefficient, heavy material of a high ballistic coefficient and particulate of a lower ballistic coefficient than the light material;
the light material comprising leaves;
the heavy material comprising flowers and stems;
positioning the separation tray into a tray seal mounting assembly, comprising an upper seal and a lower seal, wherein the upper seal attaches the separation tray to a separation chamber and the lower seal attaches the separation tray to an airflow enclosure;
controlling airflow characteristics of one or more fans mounted within the airflow enclosure, lifting the material into the separation chamber from the separation tray;
adjusting the airflow characteristics of the one or more fans based on a moisture content of the material, and a mass and drag area of the light material and the heavy material;
separating the light material from the heavy material by controlling the airflow characteristics of the one or more fans, and the orientation of a diverter assembly;
diverting the light material, through one or more first diverter ducts, the one or more first diverter ducts connecting the diverter assembly with one or more first centrifugal force appliers;
circulating the light material in the one or more first centrifugal force appliers, further separating the light material from residual particulates;
pulling particulate from the one or more first centrifugal force appliers into a particulate collection receptacle by controlling a particulate fan assembly;
collecting the light material that has fallen from the one or more first centrifugal force appliers into one or more first aggregate material receptacles;
changing the airflow characteristics of the one or more fans and the diverter assembly orientation;
diverting the heavy material, through one or more second diverter ducts, the one or more second diverter ducts connecting the diverter assembly with one or more second centrifugal force appliers;
circulating the heavy material in the one or more second centrifugal force appliers, further separating the heavy material from residual particulates;
pulling particulate from the one or more second centrifugal force appliers into the particulate collection receptacle by controlling the particulate fan assembly; and
collecting the heavy material that has fallen from the one or more second centrifugal force appliers into one or more second aggregate material receptacles.

12. A system for separating material by using variable airflow, the system comprising:
an airflow enclosure having an airflow turbulator;
a fan assembly coupled to the airflow enclosure, the fan assembly comprising one or more fans configured to direct airflow through the airflow enclosure upward through the airflow turbulator;
a separation chamber having an upper and lower tray seal;
a separation tray assembly moveably coupled to the airflow enclosure and the upper and lower tray seal of the separation chamber;
a diverter assembly coupled to the separation chamber;
one or more ducts connected to the diverter assembly; and
one or more aggregate material receptacles interconnected to the one or more ducts.

13. The system of claim 12, wherein the separation tray assembly comprises:
a separation sieve, comprising a mesh or screen material which extends the across the entirety of an opening of the separation tray; and
the separation sieve having openings of a size which would allow air to pass through the separation sieve while not allowing the material to pass through.

14. The system of claim 12, the diverter assembly comprising:
a diverter control unit; and
a diverter flap.

15. The system of claim 14, further comprising:
one or more centrifugal force appliers coupled to the one or more ducts, the one or more centrifugal force appliers configured to circulate heavy material or light material, wherein the heavy material and the light material are diverted into their own centrifugal force appliers, based on the orientation of the diverter flap and the airflow characteristics of the one or more fans.

16. The system of claim 15, further comprising:
one or more first aggregate material receptacles, receiving light material that has fallen from the centrifugal force appliers; and
one or more second aggregate material receptacle, receiving heavy material that has fallen from the centrifugal force appliers.

17. The system of claim 16, further comprising:
a particulate capture system, the particulate capture system comprising:
a particulate fan assembly, wherein the particulate fan assembly connects to the one or more centrifugal force appliers and pulls air, along with particulate, from the one or more centrifugal force appliers into a connected particulate collection receptacle.

18. The system of claim 12, wherein the upper tray seal couples the separation tray to the separation chamber and the lower tray seal couples the separation tray assembly to the airflow enclosure.

19. The system of claim 12, further comprising:
a linear motion system, comprising a linear motion drive motor and linear motion tracks, wherein the separation tray assembly is operatively coupled to linear motion system to move the separation tray assembly from a first position for loading material to a second position for separating the material.

20. The system of claim 12, further comprising:
a fan control unit operatively connected to the fan assembly, the fan control unit for adjusting the airflow characteristics of the one or more fans.

* * * * *